Patented Aug. 8, 1950

2,517,750

UNITED STATES PATENT OFFICE 2,517,750

PREPARATION OF IMIDAZOLIDONES

Alexander L. Wilson, Sharpsburg, Pa., assignor, by mesne assignments, to Union Carbide and Carbon Corporation, a corporation of New York No Drawing. Application April 1, 1943, Serial No. 481,480

4 Claims. (Cl. 260—309)

This invention relates to imidazolidones and more particularly to an improved method of making them. It includes also new chemical compounds which may be prepared by my method.

Imidazolidone-2, or ethylene urea,

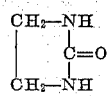

is useful as an intermediate in the production of the high explosive, ethylene dinitramine, $C_2H_4(NHNO_2)_2$. According to Beilstein (vol. I, page 1301) dinitroimidazolidone-2, which may be obtained by dissolving imidazolidone-2 in nitric acid, decomposes readily into ethylene dinitramine and carbon dioxide merely on boiling in aqueous solution. Ethylene dinitramine explodes spontaneously on heating it to the comparatively low temperature of 180° C. and its brisance is reported (Hale Patent 2,011,578) as comparable to that of such powerful explosives as nitroglycerine (glyceryl nitrate), tetryl or the like although in resistance to detonation by shock it corresponds more nearly to such relatively insensitive explosives as picric acid or trinitrotoluene.

The preparation of imidazolidone-2 from diethyl carbonate, $(C_2H_5)_2CO_3$, and urea, $NH_2CONH_2$, was described as early as 1886 by Fischer and Koch (Annalen, 232, 227), and since that time it has been reported by a number of investigators as obtained by other methods. More recently, it has been proposed to supply the war requirements for this intermediate on a large scale by reacting ethylene diamine with either carbonyl chloride, $COCl_2$, or diethyl carbonate. Serious problems are presented by both processes. The first process must be carried out under pressure, and the exceedingly high toxicity of the carbonyl chloride requires that more than ordinary precautions be taken for safety. Also, the corrosive conditions prevailing during this reaction introduce additional complications. In the second process the diethyl carbonate is a relatively high cost starting material ordinarily prepared from carbonyl chloride, and the use of carbonyl chloride in the synthesis of diethyl carbonate merely interposes an additional step in the production of imidazolidone-2, with difficulties similar to those attaching to the first process.

I have discovered that imidazolidone-2 may be conveniently and readily produced in good yield by reacting ethylene diamine with urea. The reaction may be illustrated as follows:

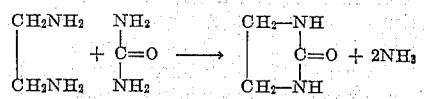

The reaction presents no difficult or unusual problems of corrosion, and it may be conducted in simple equipment. For instance, it may be carried out very conveniently by mixing the reactants and heating them under a reflux or in a suitable autoclave over a period of about one to five hours, depending largely upon the temperatures employed. Urea, which is relatively insoluble in ethylene diamine at room temperature, goes into solution readily on warming the reaction mixture. Ammonia, the only other product of the above reaction, begins to come off when the reaction mixture reaches a temperature of about 100° to 115° C., and the course of the reaction may be followed by the rate at which the ammonia is evolved. The greater part of the ammonia may be expelled below 170° C. The reaction is carried to completion by continuing the heating, usually at an end temperature of about 170° to 240° C. until the evolution of ammonia from the reaction ceases. Heating which is unduly prolonged, in order to expel the last traces of ammonia, may result in decomposition of the desired product.

I have found that imidazolidone-2 may be obtained according to my process, using various proportions of the reactants, although certain ranges of proportions may be found to give higher yields than others or enable the reaction to be conducted more smoothly. With substantially equimolecular amounts of the reactants, there is formed, along with the main products, a high proportion of a white, relatively insoluble and infusible material of undetermined, and possibly polymeric composition. Also, prior to evolution of the quantity of ammonia required by theory for the formation of imidazolidone-2, the reaction mixture assumes a partially-liquid or semi-solid state. At this stage the evolution of ammonia no longer proceeds smoothly, and uniform heating of the reaction mixture becomes very difficult, although satisfactory yields may be obtained if an end temperature of about 220° to 240° is eventually reached. The tendency toward solidification may be avoided or diminished to some extent and better yields obtained by the addition of imidazolidone-2 up to about fifty percent by weight of the reaction mixture.

The tendency toward solidification increases with an excess of urea over the ethylene diamine. For instance, with urea and ethylene diamine used in a ratio of two to one, crystallization of the reaction mixture comes on suddenly when about one half the ammonia, based on the ethylene diamine, has been evolved. Continuance of the heating to the indicated end temperature for the completion of the reaction is possible but little if any imidazolidone-2 is obtained. The product, melting at about 190° C., is almost entirely ethylene diurea, $NH_2CONHC_2H_4NHCONH_2$, An excess of ethylene diamine in the reaction mixture is also effective in reducing the tendency to solidify, and for this purpose at least 1.25 times the amount required by theory to convert all of the urea to the imidazolidone is preferred. In general, very good results may be obtained with ratios of about 1.5 to 3 moles of ethylene diamine for each mole of urea. If desired, even larger proportions of the amine may be used, although no added benefit seems to be gained.

Unless the amine is employed in sufficient excess, however, the reaction mixture may set up to a semi-solid mass on heating it to a temperature of about 150° to 180° C. Within this range, the temperature at which a particular mixture solidifies is dependent on such factors as the rate of heating; the amount of water and excess of amine present; and the like. Continued direct heating of the mixture after solidification is likely to cause scorching and decomposition, and further evolution of ammonia is accompanied with spattering and release of the gas with almost explosive force. If the product is removed and examined at this semi-solid stage, it will be found to be largely amorphous material which partly dissolves and partly gelatinizes in water, but some yield of the imidazolidone may be recovered with difficulty. If, on the other hand, this semi-solid reaction mixture is heated with care, as in an oil bath, it liquefies with evolution of ammonia beginning at a temperature of about 200° C. to 220° C. and at a temperature of about 230° to 240° C. it becomes a clear liquid which is almost pure imidazolidone-2. The same final result may be reached somewhat more quickly by first liquefying a small portion of the solidified reaction mixture, or a sample of imidazolidone-2, and then adding to it slowly or in small increments the remainder of the reaction mixture while maintaining the melted portion at a temperature of about 200° to 230° C. As a matter of convenience in handling the reaction mixture according to the latter procedure, it is preferable to stop the heating of the urea and ethylene diamine at a temperature of about 130° to 160° C. where a sufficient excess of unreacted amine still remains to insure that the material will remain in the liquid state. By either of these procedures the ammonia may be evolved smoothly to completion of the reaction without spattering of the material as in the case of the semi-solid mixture.

Exceptionally good results are obtainable using about two moles of the amine per mole of urea. The lowering of the refluxing temperature is not excessive nor is the reaction period unduly prolonged; and the purification of the imidazolidone is not additionally complicated. The reaction may be conducted with the evolution of ammonia proceeding very smoothly and easily throughout, and the tendency toward solidification is evidenced only by a milkiness developing by the time the mixture reaches a temperature of about 170° C. The reaction product which is obtained as a residue upon removal of the excess ethylene diamine is composed entirely of the imidazolidone, with the exception of not more than about one to two percent of an infusible impurity which is insoluble in methanol and water, and readily removable from the imidazolidone by ordinary crystallization procedures. The yields, based on the urea, are 98 to 99 percent or higher and the excess ethylene diamine may be recovered substantially quantitatively from the reaction mixture, by distillation. An end temperature of about 220° C. is usually suitable for producing imidazolidone-2 having less than one percent of impurity. In order to permit the desired end temperature to be attained under reflux, ethylene diamine may be distilled from the reaction mixture from time to time, as desired; but to insure that one mole of combined ethylene diamine per mole of urea will remain in the reaction mixture for completion of the reaction at the end temperature range, it is important to carry out a refluxing at an initial or lower temperature range of the reaction until at least one mole of ammonia per mole of urea has been evolved. Ordinarily, a refluxing period of about one to five hours with the reaction mixture at a temperature of about 115° C. to 135° C. is adequate. The heating may then be continued and the temperature increased for further evolution of ammonia until the desired end temperature is attained. The insoluble impurity content of the reaction mixture increases gradually during the course of the reaction and may reach as high as about 2.5 to 13 percent of the imidazolidone up to a temperature of 170° to 200° C. Thereafter, the content of infusible impurity decreases with increasing temperature, although it does not appear that temperatures above 215° to 240° C. are beneficial toward this end.

I have found also that my process is useful for the preparation of imidazolidones generally, by the reaction of urea with 1,2 alkylene polyamines. By 1,2 alkylene polyamines I mean compounds having a pair of amino nitrogen atoms attached to adjacent aliphatic carbon atoms, each such nitrogen atom being attached to but one of the adjacent carbon atoms. In order for the reaction to take place it seems to be essential to have reactive or replaceable hydrogen atoms attached to these nitrogen atoms. Other radicals or groups which do not interfere with the reaction are not necessarily excluded from the compounds, and there may be present in the molecule, for instance, additional amino groups, various hydrocarbon radicals attached to either the nitrogen or carbon atoms, and the like. Exceptionally good results are obtainable with 1,2 alkylene polyamines in which at least one of the amino groups attached to adjacent carbon atoms is a primary amino group. The following list of amines is illustrative.

Ethylene diamine, $NH_2C_2H_4NH_2$
Propylene diamine, $NH_2CH(CH_3)CH_2NH_2$
Butylene diamine-1,2, $NH_2CH(C_2H_5)CH_2NH_2$
Butylene diamine-2,3, $NH_2CH(CH_3)CH(CH_3)NH_2$
Phenylethylene diamine, $C_6H_5NHC_2H_4NH_2$
Benzyl ethylene diamine, $C_6H_5CH_2NHC_2H_4NH_2$
Toluyl ethylene diamine, $CH_3C_6H_4NHC_2H_4NH_2$
Ethylethylene diamine, $C_2H_5NHC_2H_4NH_2$
Hydroxyethyl ethylene diamine, $$HOC_2H_4NHC_2H_4NH_2$$

Diethylene triamine, $NH_2C_2H_4NHC_2H_4NH_2$
Triethylene tetraamine, $$NH_2C_2H_4NHC_2H_4NHC_2H_4NH_2$$

The latter amine yields a compound having a dicyclic ring structure, ethylene bis-imidazolidone-2,(bis 1,1'(imidazolidone-2)-1,2 ethane).

Instead of simple urea, a lower-alkyl substituted urea may be used. By lower-alkyl ureas I mean those compounds in which one or more but not all of the amide hydrogen atoms have been replaced by an alkyl radical having not more than 8 carbon atoms to the radical, including such substituted ureas as mono methyl urea, dimethyl urea, trimethyl urea, and symmetrical and unsymmetrical homologs thereof.

Imidazolidones which may be obtained according to my process include the following:

Imidazolidone-2
4-methyl imidazolidone-2
4-ethyl imidazolidone-2
4,5-dimethyl imidazolidone-2
1-phenyl imidazolidone-2
1-benzyl imidazolidone-2
1-toluyl imidazolidone-2
1-ethyl imidazolidone-2
1-(hydroxy ethyl) imidazolidone-2
1-(2-urea ethyl) imidazolidone-2
Bis 1,1'(imidazolidone-2) 1,2 ethane The invention may be further illustrated by the following examples. In the examples where the amine is in excess, the stated yield of the imidazolidone is based on the urea.

EXAMPLE 1

*Imidazolidone-2*

A mixture containing 120 grams (2 moles) of anhydrous ethylene diamine and 120 grams (2 moles) of urea was heated under a reflux. Ammonia began to come off at a temperature of about 105° C. and by the time the temperature had reached 155° C. about one mole of ammonia per mole of amine (or urea) had been evolved. The reaction mixture solidified and only a small amount of ammonia was evolved on heating from 155° C. up to about 200° C. The final product was obtained after rapidly heating the solidified reaction mixture to about 280° C. It was largely water soluble and yielded crystals melting at about 127° C.-128° C., on crystallization from methanol. On recrystallization from ethanol the melting point was raised to 129°–131° C. The yield was about 85 grams, corresponding to a 51 percent yield of imidazolidone-2. There was also obtained about 20 grams of chloroform-soluble products and about 16 grams of insoluble, amorphous material.

EXAMPLE 2

*Imidazolidone-2*

Aqueous ethylene diamine (95 percent) and urea in a ratio of 1.2 moles of the amine per mole of urea were refluxed for a period of four hours until the temperature of the reaction mixture rose to 155° C. During the refluxing 1.91 moles of ammonia for each mole of urea were evolved. Ethylene diamine was then distilled off slowly at atmospheric pressure until the reaction mixture reached a temperature of 200° C. Thereafter the distillation was continued at reduced pressure to remove the residual ethylene diamine to an end pressure of 25 mm., mercury and an end temperature of 180° C. Imidazolidone in about 63 percent yield was recovered by fractionally crystallizing the reaction product from ethanol. Some of the product was lost in the crystallization, and the amount of insoluble amorphous material was small. The evolution of ammonia took place smoothly and no excessive tendency for the reaction mixture to solidify was noted during the reaction.

EXAMPLE 3

*Imidazolidone-2*

Commercial ethylene diamine (70 percent) and urea were mixed in a ratio of 1.5 moles of amine per mole of urea and refluxed for four hours to an end temperature of 126° C. in the reaction mixture. The water present amounted to 2.23 moles per mole of urea. Ammonia was evolved equivalent to 1.42 moles for each mole of urea. Water and ethylene diamine were then distilled off slowly, under rectification, at atmospheric pressure until the reaction mixture reached 240° C., accompanied by a further evolution of ammonia amounting to 0.53 mole per mole of urea. The reaction product as obtained was only slightly colored, and colorless imidazolidone-2 melting at 129° C. was obtained in 89 percent yield on two crystallizations. The yield was raised to 92 percent on further heating of the mother liquor containing amorphous material to 240° C., and the residue of insoluble amorphous material by-product was small.

EXAMPLE 4

*Imidazolidone-2*

A mixture containing 6 moles of ethylene diamine in the form of a commercial, aqueous solution (70 percent) and 4 moles urea was refluxed for five hours until the reaction mixture reached a temperature of 126° C. At the end of this time 6.25 moles of ammonia (amounting to 1.56 moles per mole of urea) had been evolved. Ethylene diamine was then distilled off over a period of five hours at atmospheric pressure until a temperature of about 260° C. had been attained in the mixture. About 1.73 moles more of ammonia were expelled for a total of 7.98 moles or almost 2 moles per mole of urea. After the traces of ethylene diamine had been removed at reduced pressure up to a temperature of 245° C. at 17 millimeters, mercury, the product obtained as a residue was crystallized from methanol. The yield of imidazolidone-2 melting at 129° C. was 96.1 percent.

EXAMPLE 5

*Imidazolidone-2*

To 900 parts by weight of urea (15 moles) were added 1928 parts of an aqueous solution containing 70 percent ethylene diamine (22.5 moles) and the mixture heated under a reflux over a period of four hours. The boiling temperature of the mixture increased from 100° to 118° C. during that time and 315 parts by weight of ammonia (18.4 moles) were evolved. About 807 parts by weight of ethylene diamine were then distilled off over a period of 2 hours. During this period 19 parts by weight of ammonia were additionally expelled, and the boiling temperature of the mixture increased to about 140° C. At this stage the liquid which was clear and somewhat viscous became cloudy and considerably more viscous at room temperature. On reheating to 100° C. the cloudiness cleared up.

The reaction mixture was then subjected to a flash distillation in two batches of equal amounts. The liquid reaction mixture was added continuously to the distillation flask and the distillate removed at a rate which permitted the temperature to be maintained at about 215° to 240° C. The time required was 2.2 hours for the first batch and 0.67 hour for the second. This product which was a clear liquid at 240° C. was then vacuum stripped for about one half hour at 200° C. under an end pressure of about 15 mm. mercury. There was obtained 1265 parts by weight (14.67 moles) of imidazolidone-2, corresponding to a yield of 98 percent. The ethylene urea was free of color and contained not more than 0.3 percent ethylene diamine and 0.3 amorphous impurity by weight. It melted at 128° to 128.5° C.

EXAMPLE 6

Imidazolidone-2

Aqueous 70 percent ethylene diamine and urea in the proportion of 2 moles of the amine to 1 mole of urea were refluxed for a period of five hours to a temperature of 125° C. for the mixture, and ethylene diamine then distilled off up to a temperature of about 170° C. over a period of 2 hours substantially following the procedure described in Example 5. The last traces of ethylene diamine were then removed from the residue up to a temperature of about 220° C. under reduced pressure. Commencing at a temperature of about 170° C. the reaction mixture became milky in appearance, but cleared up on further heating to 200° to 215° C. Colorless imidazolidone-2, having a content of insoluble, infusible impurity of not more than 1.7 percent by weight, was obtained in 98 percent yield.

EXAMPLE 7

Imidazolidone-2

Aqueous 70 percent ethylene diamine and urea were reacted following the procedure of Example 6, using a reaction mixture in which the amine was in excess in the molar ratio of 3 to 1. After the preliminary refluxing, the removal of excess ethylene diamine up to a temperature of 170° C. took place over a period of about six hours. Except for a slight transient cloudiness taking place at a temperature of about 190° C. to 215° C., the reaction mixture was clear in appearance throughout the reaction. The product contained not more than 0.7 percent by weight of insoluble, infusible impurity and the yield of imidazolidone-2 having a melting point of 129° was about 99 percent.

EXAMPLE 8

Imidazolidone-2

A reaction mixture containing two parts by weight of urea (10 moles), three parts by weight of ethylene diamine (15 moles) in 70 percent aqueous solution and one part by weight of imidazolidone-2 was heated under a reflux over a period of about 6.5 hours. For the first four hours the charge was allowed to simmer with but little refluxing under moderate heating. During this part of the heating somewhat more than one half of the theoretical amount of ammonia was evolved, with the temperature rising to about 125° C. The heating was then increased with the temperature rising to about 175° at the end of 5.5 hours and about 225° at the end of 6.2 hours. After maintaining the reaction mixture at an end temperature of about 240°-245° C. for a brief period—approximately 20 minutes—to complete the reaction, the product was vacuum stripped.

During the course of reaction, an initial cloudiness was noted at about 165° C., and the reaction mixture began to be non-homogeneous at about 170° to 180° C. The reaction mixture remained liquid throughout the reaction, however, with no lumping or caking taking place. The viscosity reached a maximum at about 200°-205° C., and above that temperature thinning took place rapidly. Translucency developed at 244° C., and on cooling there was obtained crystalline imidazolidone-2 of good color, melting at about 128°-129° C. The yield was about 96-97 percent. There was also obtained an amorphous, methanol-insoluble material amounting to about 2 percent.

EXAMPLE 9

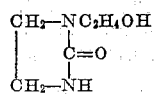

1-hydroxyethyl imidazolidone-2

Urea and aminoethyl ethanolamine,

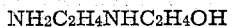

were mixed in approximately equimolecular proportions. Two moles of ammonia were evolved on heating the mixture to 200° C. The colorless liquid which resulted was vacuum-stripped and the residue crystallized from acetone. There was obtained a good yield of 1-hydroxyethyl imidazolidone-2 in the form of exceedingly hygroscopic crystals melting at 50°-51° C.

EXAMPLE 10

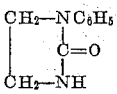

1-phenyl imidazolidone-2

Aminoethylaniline, $C_6H_5NHC_2H_4NH_2$, and urea were reacted using about equimolecular proportions in the reaction mixture. Only about 0.8 mole of ammonia was evolved up to a temperature of about 250° C. 1-phenyl-imidazolidone-2 melting at 159°-160° C. was obtained on crystallizing the reaction product from methanol.

EXAMPLE 11

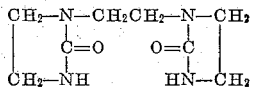

Bis 1,1'(imidazolidone-)-1,2 ethane

Linear triethylene tetramine and urea were reacted in a mixture containing an excess of amine in the proportion of 1.1 moles for each 2 moles of urea. Slightly less than four moles of ammonia, corresponding to about 95 percent of theory, were evolved on heating the reaction mixture over a temperature range of about 115° to 180° C. At the latter point the reaction mixture crystallized with evolution of heat, raising the temperature to 195° C. The reaction product was then washed with methanol and crystallized from water. The final dicyclic product which melted at 240°-245° C. was obtained in 80 percent yield.

EXAMPLE 12

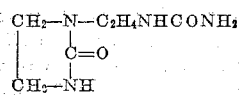

Imidazolidonyl ethyl urea

A mixture containing urea, 103 parts by weight of diethylene triamine, and 103 parts by weight of water, was heated under a reflux for a period of about 5.5 to 6 hours, to an end temperature of about 107° to 112° C. Upon crystallization of the product from the reaction mixture and washing it with methanol, there was obtained a readily water-soluble, white crystalline solid melting at 200°-203° C., which was identified as imidazolidonyl ethyl urea.

The yield of product was about 47 percent and the amount of ammonia evolved corresponded to about 2.2 moles per mole of amine, using about two moles of urea per mole of diethylene triamine in the reaction mixture. With a reaction mixture containing three moles of urea per mole of amine the yield was 90 percent and 2.9 moles of ammonia per mole of diethylene triamine were evolved.

The invention is susceptible of modifications within the scope of the appended claims.

I claim:

1. A process for producing a substituted imidazolidone-2-compound having a total of not less than four carbon atoms to the molecule, which comprises heating in the liquid phase a urea of the group consisting of $CO(NH_2)_2$ and lower alkyl substituted ureas having at least one amide hydrogen atom with a 1,2 alkylene polyamine of not less than three carbon atoms to the molecule, in which each nitrogen atom of a pair of nitrogen atoms attached to adjacent carbon atoms has a hydrogen atom attached thereto, at a temperature from about 100° to 280° C., said 1,2-alkylene polyamine being present at least in an amount theoretically required to react with all of the urea.

2. As a new chemical compound, an imidazolidone of the group consisting of

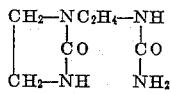

and

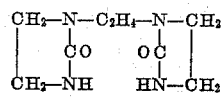

3. As a new chemical compound

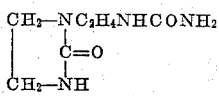

4. As a new chemical compound

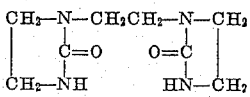

ALEXANDER L. WILSON.

REFERENCES CITED

The following references are of record in the file of this patent:

UNITED STATES PATENTS

| Number | Name | Date |
|---|---|---|
| 1,785,730 | Davis | Dec. 23, 1930 |
| 2,145,242 | Arnold | Jan. 31, 1939 |
| 2,253,528 | Olin | Aug. 26, 1941 |
| 2,257,717 | Olin | Sept. 30, 1941 |

OTHER REFERENCES

Fischer and Koch, Annalen, vol. 232, p. 227.

Beilstein-Organische Chemie Vierte Auflage, vol. 24, pp. 2 and 3, vol. 24 supplement, p. 184.

Chem. Abstracts, vol. 32, p. 488, citing: Annalen der Chemie, vol. 532, pp. 300–301 (1937).

Hansen, "The Synthesis of Ethylene Urea," 1939.